United States Patent [19]
Rossiter et al.

[11] Patent Number: 5,171,548
[45] Date of Patent: Dec. 15, 1992

[54] PROCESS FOR THE REMOVAL OF VANADIUM FROM WET PROCESS PHOSPHORIC ACID

[75] Inventors: Gordon J. Rossiter, Lakeland; Stephen F. Pease, Seffner; Charles B. Snyder, Lakeland, all of Fla.

[73] Assignee: Advanced Separation Technologies Incorporated, Lakeland, Fla.

[21] Appl. No.: 533,877

[22] Filed: Jun. 6, 1990

[51] Int. Cl.$^5$ .................... B01D 11/00; C01G 31/00; C01B 25/16

[52] U.S. Cl. ........................... 423/63; 423/64; 423/321 R; 423/321 S

[58] Field of Search ............ 423/321 R, 63, 64, 321 S

[56] References Cited

U.S. PATENT DOCUMENTS

| | | |
|---|---|---|
| 2,193,092 | 3/1940 | Frick et al. |
| 2,211,119 | 8/1940 | Hixson et al. .................. 423/63 |
| 2,357,488 | 9/1944 | Nelson . |
| 3,131,993 | 5/1964 | Gustison et al. .................. 423/63 |
| 3,700,415 | 10/1972 | Koerner et al. . |
| 3,711,591 | 1/1973 | Hurst et al. . |
| 3,734,696 | 5/1973 | Lucid et al. . |
| 3,836,476 | 9/1974 | Baldwin et al. . |
| 4,053,562 | 10/1977 | Harnisch et al. ............... 423/321 R |
| 4,341,743 | 7/1982 | Tebbe . |
| 4,374,805 | 2/1983 | Worthington et al. ......... 423/321 R |
| 4,424,195 | 1/1984 | Korchnak et al. ............... 423/321 R |
| 4,851,199 | 7/1989 | Young .............................. 423/321 R |
| 4,978,511 | 12/1990 | Young .............................. 423/321 R |
| 5,006,319 | 4/1991 | Hall et al. ............................ 423/63 |

FOREIGN PATENT DOCUMENTS 488782  1/1976  U.S.S.R. ................. 423/321 R

OTHER PUBLICATIONS

"Recovery of Uranium, Vanadium, Yttrium and Rare Earths from Phosphoric Acid by a Precipitation Method", K. Weterings et al., *Hydrometallurgy*, 15 (1985) pp. 173-190.

"Recovery of Uranium from Wet-Process Phosphoric Acid", Fred J. Hurst et al., Process Technology Phosphoric Acid and Its Derivatives.

*Primary Examiner*—Gregory A. Heller
*Attorney, Agent, or Firm*—Burns, Doane, Swecker & Mathis

[57] ABSTRACT

A process for removal of vanadium from wet process phosphoric acid comprising the steps of;
(i) adsorbing an anionic pentavalent complex of vanadium, derived from the wet process phosphoric acid, onto an anion exchange resin or into an organic layer; and
(ii) reducing the vanadium complex to trivalent and/or tetravalent vanadium so as to selectively strip vanadium from the anion exchange resin or from the organic layer.

27 Claims, 4 Drawing Sheets

PROCESS FOR THE REMOVAL OF VANADIUM FROM WET PROCESS PHOSPHORIC ACID

BACKGROUND OF THE INVENTION

The present invention relates to removal of vanadium from phosphoric acid and, more particularly, to a process for removal of vanadium from a wet process phosphoric acid by ion exchange.

Phosphoric acid is produced in large quantities by chemical companies all over the world. The raw material feed for phosphoric acid production is typically the mineral fluorapatite, a calcium phosphate fluoride compound. Digestion of this mineral in an aqueous solution of a strong acid such as sulfuric acid solubilizes the phosphate species. The product slurry is then filtered to yield a liquid usually containing about 28–30% $P_2O_5$. In addition to phosphorus, the acid contains soluble impurities that were present in the raw feed and which dissolve in the 28–30% $P_2O_5$ liquid. Among these impurities is vanadium at concentrations that usually range from 50 to 1500 ppm, as $V_2O_5$, and even higher.

When present at high enough levels, vanadium is toxic to animals. Quite clearly, therefore, the presence of vanadium in phosphoric acid destined for processing into agricultural products such as animal feeds is to be avoided. In fact, the toxicity of vanadium is such that if it is present at levels greater than approximately 250 ppm, as $V_2O_5$, in a 30% phosphoric acid, the downstream products will be unusable for animal feed. It is also desirable to remove vanadium from a phosphoric acid in view of its commercially valuable applications. More specifically, it is well known that vanadium has an economic value as a strategic metal. Additionally, vanadium is of great importance to the steel industry which employs vanadium in the form of ferrovanadium alloys. Vanadium pentoxide granules are also utilized as a catalyst in the production of sulfuric acid from sulfur dioxide gas feed.

Thus, both in terms of its deleterious effect on agricultural products formulated from phosphoric acid and in terms of its value in its own right in a number of commercial applications, it is desirable to remove vanadium from phosphoric acid and to recover such vanadium for separate commercial use.

The desirability of removing vanadium from phosphoric acid notwithstanding, the art has thus far failed to provide a reasonable process for doing so. To the contrary, the major processes available for vanadium recovery namely, direct precipitation and solvent extraction, both suffer from a number of significant shortcomings which are discussed in greater detail below.

For example, Waggerman describes, in *Phosphoric Acid, Phosphates and Phosphatic Fertilizers*, 2d. edition, Rheinhold Publishing Corporation, pp. 189–190 and 230–231 (1952), a process for recovery of vanadium from phosphate deposits as a by-product in the manufacture of phosphoric acid by either the thermal reduction method or the sulfuric acid process. In the sulfuric acid process (which is the same as the wet phosphoric acid process), the vanadium which is dissolved in sulfuric acid is recovered by the addition of sodium ferrocyanide which causes it to precipitate. Precipitation is achieved alternatively by concentrating the acid to 53° Bé by evaporation, filtering the acid, and then adding sodium chlorate.

A process involving precipitation of vanadium using oxidizing agents is described in U.S. Pat. No. 2,193,092 by Frick et al wherein phosphate rocks containing vanadium are leached with sulfuric acid for the preparation of phosphoric acid. When the impure phosphoric acid is evaporated to 53° Bé and treated under suitable conditions with an oxidizing agent such as sodium chlorate, the tetravalent vanadium is oxidized to the pentavalent oxide form. The pentavalent vanadium then combines with phosphoric acid to form hydrates which are relatively insoluble in water at ordinary atmospheric temperatures. These hydrates, phosphate vanadic acids, are yellow crystalline compounds readily separated from the phosphoric acid by settlement and filtration. The precipitate may then be purified by heating it with a solution of soda ash and hydrated lime. The calcium reacts with the phosphorus producing substantially insoluble calcium phosphate and liberating vanadic acid, with the production of a vanadic acid solution and an insoluble residue.

The recovery of vanadium from phosphoric acid solutions by a precipitation technique as described above gives rise to a number of disadvantages. In the first place, the above-described sodium ferrocyanide precipitation process requires the addition to the phosphoric acid solution of a precipitating agent. Such agent, which is a chemical species which is foreign to the phosphoric acid mixture, can be deleterious to the quality of the final product and, consequently, to the product's marketability. Another problem of a precipitation technique relates to the fact it always leaves a residual quantity of vanadium in solution that corresponds to the solubility of $V^{+5}$. As a consequence, the amount of vanadium ultimately recovered is diminished by the amount of $V^{+5}$ which remained in the phosphoric acid solution.

As an alternative to a precipitation process, solvent extraction processes have also been developed for the removal of vanadium from phosphoric acid solutions. For example, tri-isooctyl phosphine oxide (TOPO) has been demonstrated to extract vanadium from wet process phosphoric acid. Specifically, as set forth in Koerner et al, U.S. Pat. No. 3,700,415, vanadium is recovered from wet process phosphoric acid by extraction of the acid at a pH of from about 0.0 to about 1.5 using an organic extractant comprising a hydrocarbon solvent and a neutral organic phosphorus compound, for example, tri-n-octyl phosphine oxide.

U.S. Pat. No. 3,374,696 of Lucid et al also describes a solvent extraction process for recovery of vanadium from acidic solutions containing fluoride using amines in a water-immiscible organic solvent. The vanadium is complexed with the extractant and extracted into the organic phase. Prior to the extraction, wet process phosphoric acid is treated with an oxidizing agent to convert the vanadium from the +4 to the +5 oxidation state. Without converting the vanadium to the pentavalent state, the extraction process with the complexing agents is not satisfactory, as vanadium in the lower oxidation state does not form a complex with the extractants contemplated within the scope of the invention. Fluoride, which is believed to complex with the vanadium and the complexing agent, must be present in the wet process phosphoric acid in order for the extractants to properly complex the vanadium.

The above-described solvent extraction techniques, as with the precipitation techniques, give rise to a number of substantial disadvantages. In the first place, solvent extraction processes are accompanied by organic entrainment into the aqueous phosphoric acid phase and its detrimental consequences. Such organic compounds act as solvents and can cause damage to downstream processing equipment that contains rubber and plastics. Additionally, many of the organics employed are themselves toxic. Finally, solvent exchange processes virtually invariably give rise to the formation of a third phase of emulsified crud. Such crud is particularly undesirable in large scale processes since it reduces the capacity of settlers, interferes with mass transfer, and leads to losses of both the organic and the aqueous phase materials from which the crud is composed. While technology does exist for the removal of the valuable components from the crud, it is clearly preferable if formation of such crud can be avoided from the outset in order to avoid the time and costs which would be associated with the additional processing.

Thus, in terms of the amount of product recovered, the purity of the product recovered, efficiency of the recovery process itself, and deleterious effects on the treated acid, prior art processes have proven to be unsatisfactory in separating vanadium from a wet process phosphoric acid.

SUMMARY AND OBJECTS OF THE INVENTION

In view of the foregoing limitations and shortcomings of prior art processes for removing vanadium from a wet process phosphoric acid, as well as other disadvantages not specifically mentioned above, it should be apparent that there exists a need in the art for a process for the removal of vanadium from wet process phosphoric acid which achieves such removal without the need for relying on conventional precipitation or solvent extraction techniques giving rise to the above-enumerated disadvantages. It is, therefore, a primary object of the present invention to fulfill that need by providing a process for removal of vanadium from phosphoric acid which relies on oxidation/reduction of such vanadium species for achieving the desired separation, whether by solvent extraction or ion exchange.

It is another object of the present invention to provide a process for the removal of vanadium from phosphoric acid requiring no special processing fluids, other than the phosphoric acid itself, for loading and removing the vanadium complex from the exchange material and requiring no separate wash and rinse fluids.

Yet another object of the present invention is to provide a process for the removal of vanadium from phosphoric acid wherein all of the phosphoric acid used to load and remove vanadium from the exchange material is itself recovered for subsequent processing and thus, no waste streams are generated.

It is a further object of the invention to provide a process for the removal of vanadium from phosphoric acid wherein no water of dilution is required so that the concentration of the phosphoric acid effluent is virtually identical to its feed concentration.

Another object of the present invention is to provide a process for the removal of vanadium from phosphoric acid which theoretically enables recovery of 100% of the vanadium contained in the phosphoric acid.

In a first aspect, the present invention relates to a process for removal of vanadium from wet process phosphoric acid comprising the steps of:

adsorbing an anionic pentavalent complex of vanadium, derived from the wet process phosphoric acid, onto an anion exchange resin or into an organic layer; and reducing the vanadium complex to trivalent and/or tetravalent vanadium so as to selectively strip vanadium from the anion exchange resin or from the organic layer.

In a preferred embodiment of the first aspect, the anionic pentavalent complex of vanadium derived from the wet process phosphoric acid and adsorbed to an anion exchange resin is obtained by:

(i) oxidizing vanadium contained in a phosphoric acid stream to pentavalent vanadium;

(ii) complexing the pentavalent vanadium with an anionic species to form an anionic pentavalent vanadium complex capable of being adsorbed onto an anion exchange resin site;

(iii) adsorbing the anionic pentavalent vanadium complex onto the exchange resin.

Preferably, the above process further comprises the step of oxidizing the trivalent and/or tetravalent vanadium stripped from the anion exchange resin to precipitate phosphovanadic acid.

Such precipitation can be carried out without concentrating the vanadium in the solution, e.g., using a 25-30% phosphoric acid solution.

In a preferred aspect, the present invention relates to a process for removal of vanadium from phosphoric acid comprising the steps of:

(i) oxidizing vanadium contained in a phosphoric acid to pentavalent vanadium (ii) complexing the pentavalent vanadium with an anionic species to form an anionic pentavalent vanadium complex capable of being adsorbed onto an anion exchange resin site;

(iii) feeding the anionic vanadium complex through one or more fixed feed ports, defining an adsorption stage, which are in periodic fluid communication with a plurality of chambers rotating about a circular path and containing said anion exchange resin and thereby adsorbing the anionic pentavalent vanadium complex onto the anion exchange resin; and (iv) feeding a stream including a reducing agent through one or more fixed feed ports, defining a recovery stage, which are in periodic fluid communication with the plurality of chambers, and contacting the reducing agent with the anionic pentavalent vanadium complex adsorbed onto the anion exchange resin to convert the pentavalent vanadium to trivalent and/or tetravalent vanadium to selectively desorb vanadium from the resin.

With the foregoing and other objects, advantages, and features of the invention that will become hereinafter apparent, the nature of the invention may be more clearly understood by reference to the following detailed description of the invention, the appended claims and to the attached drawings.

DETAILED DESCRIPTION OF PREFERRED EMBODIMENTS

Figure 1:
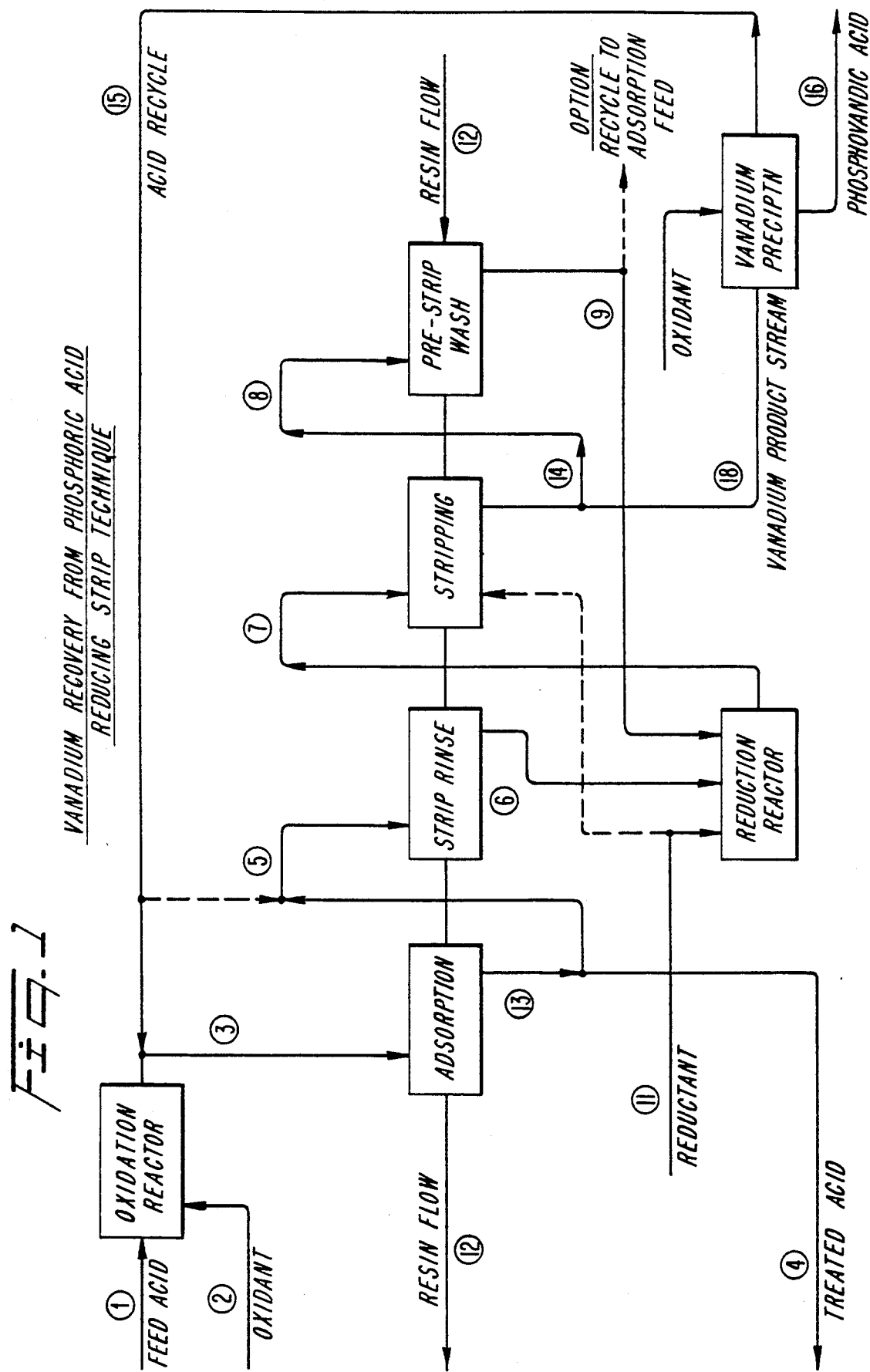
FIG. 1 is a schematic diagram of a preferred embodiment of the process of the present invention.

The general overall process scheme is shown in FIG. 1. Stream 1, the feed acid, is fed to an oxidation reactor to which is simultaneously fed the oxidant, stream 2. The phosphoric acid used as feed is generally one produced from the mineral fluorapatite in accordance with techniques well known to persons skilled in the art. Typically, the mineral is digested in an aqueous solution of an acid, such as $H_2SO_4$ whereby the phosphate species is solubilized. The product slurry is filtered to yield a liquid usually containing 28–30% $P_2O_5$.

The first step in oxidizing phosphoric acid consists in rendering the $Fe^{2+}$ into $Fe^{3+}$ because the iron becomes oxidized at a lower potential than the vanadium. Liquid oxygen is preferred to oxidize the iron because it is readily available and non-contaminating although not powerful enough to oxidize the vanadium. Of course, other oxidants well known to persons skilled in the art can be used for this purpose. Upon further oxidation with $NaClO_3$, all of the vanadium present converts into the +5 oxidation state. This is accomplished by maintaining a solution redox potential in the range between 900 and 1150 millivolts (Ag/AgCl, 4.0M KCl electrode) through addition of oxidizing agents to the feed acid stream. Other oxidants that are suitable for partial or full oxidation include, $H_2O_2$, $MnO_2$, Caro's acid ($H_2SO_5$) and others. Oxidation of the acid can be carried out at atmospheric or elevated pressure. When using liquid oxygen, pressures above atmospheric pressure are preferred. The vanadium oxidation reaction is typically represented, for the case of sodium chlorate, by the following equation:

Oxidation Of Vanadium

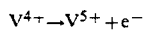

$$V^{4+} \rightarrow V^{5+} + e^-$$

Reduction of Oxidant

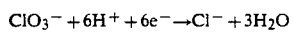

$$ClO_3^- + 6H^+ + 6e^- \rightarrow Cl^- + 3H_2O$$

The amounts of oxidant required to oxidize the vanadium can be readily determined by a person skilled in the art. Typically, in the case of $NaClO_3$, about 0.2 moles of the oxidant per mole of vanadium should be added to the phosphoric acid.

The pentavalent $VO_2^+$ species forms a complex with anionic species in the phosphoric acid solution thereby forming anionic or negatively charged species suitable for adsorption onto anion resin sites. Without being limited by theory, it is believed that one atom of vanadium is associated with one atom of both phosphorus and one atom of fluorine when adsorbed onto the anionic exchanger. The proposed species is $VO_2 \cdot F \cdot H_2PO_4^-$. A proposed adsorption reaction scheme for this species is: $RH^+ - H_2PO_4^- + VO_2 \cdot F \cdot H_2PO_4^- \rightarrow RH^+ - VO_2 \cdot F \cdot H_2PO_4^-$ The acid, now containing oxidized vanadium (stream 3) is then fed to an ion exchange column containing an anion exchange resin. The solid sorbent should be inert and should not dissolve in the phosphoric acid. A preferred sorbent is a synthetic anion exchanger of either the weak base or the strong base type. The diameter of the sorbent particles ranges from about 50 micrometers up to about 1000 micrometers, a preferred range being in the 150 to 600 micrometers diameter size fraction. The preferred range is a compromise between kinetic performance on the one hand and acceptable hydraulic pressure drop on the other.

In carrying out the ion exchange process of the present invention, there will be encountered a mass transfer resistance of adsorption which is higher than rates seen in more common ion exchanges; e.g., $SO_4^{2-}/OH^-$, $NO_3^-/Cl^-$, etc. This appears to be a consequence of the larger ionic size and low concentration of the vanadium species. Vanadium loading rates increase with a decrease in the particle size.

Figure 2:
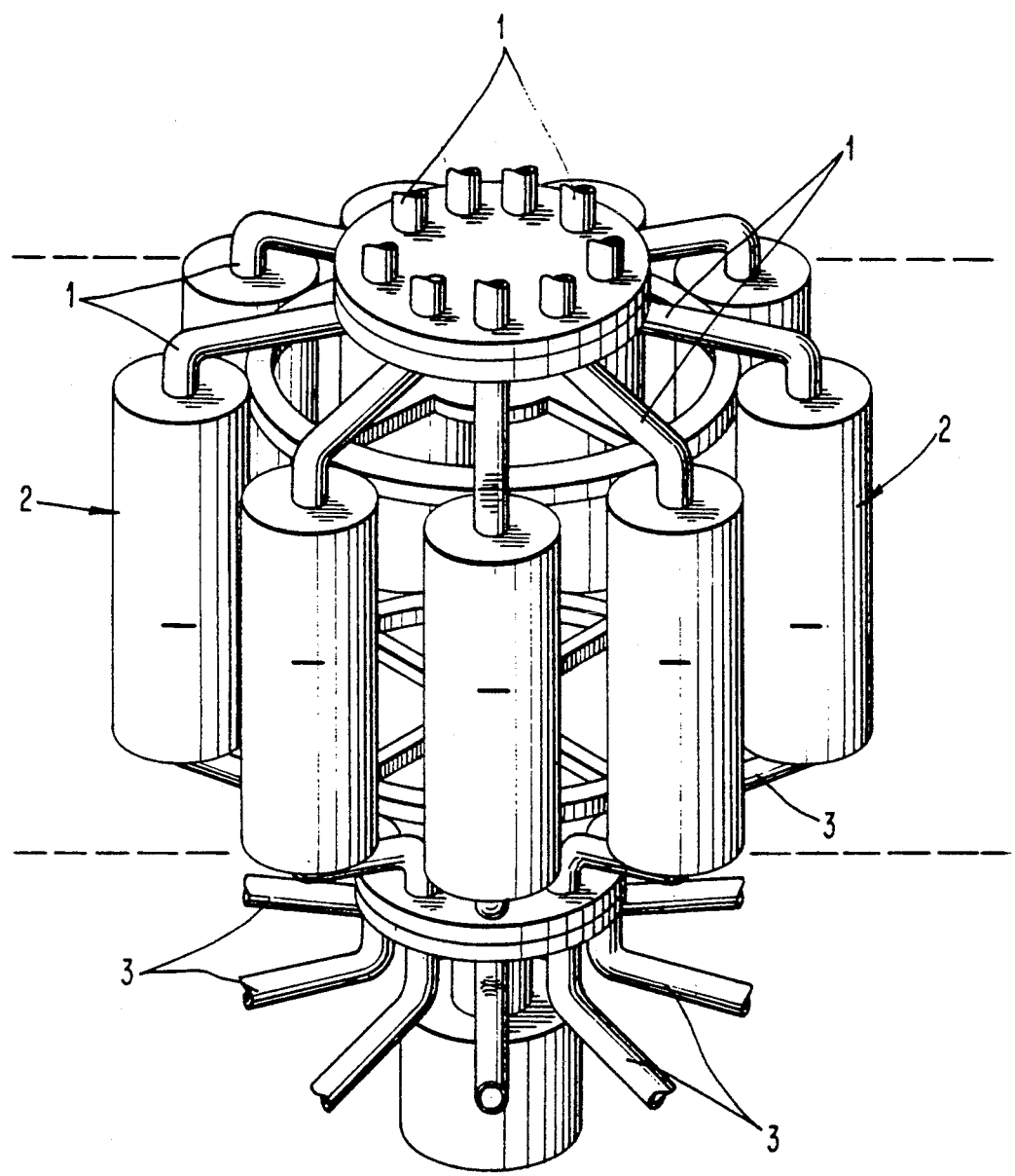
FIG. 2 is a perspective view of the ion exchange device which is employed in the preferred embodiment.

Suitable contactors for carrying out the ion exchange process include fixed beds and all available moving bed devices such as the Higgins Loop, the Himmsley column system, the Sorbex simulated moving bed system and the like. The preferred contactor is the Advanced Separation Device (ASD) moving bed which is described in U.S. Pat. Nos. 4,522,726 and 4,764,276 and 4,808,317. The ASD is illustrated in FIG. 2. It comprises a plurality of fixed feed ports 1, to each of which may be supplied the various feed materials. In the case of the present invention, these materials include the phosphoric acid feed solution as well as regenerant and stripping solutions which are described later.

Moving about a circular path in periodic fluid communication with each of the above-described fixed feed ports are a plurality of chambers 2 filled with the anion exchange resin which interacts with the feed fluids. It will be appreciated that the feed materials are supplied continuously to the respective feed ports 1 for periodic interaction with the resin in each of the chambers 2. In similar fashion, a plurality of fixed discharge ports 3 are provided at an end of the chambers opposite to that of the fixed feed ports 1. Each feed port 1 has a corresponding discharge port 3. After the product effluent passes through a given discharge port 3, it may be purged from the system, recirculated back to a selected feed port, or a combination of both. The rate of rotation of the chambers is highly dependent on their number and on the flow rates of materials. However, such can be empirically determined by those skilled in the art. Because fluids are fed into the ASD as well as discharged therefrom through fixed feed and discharge ports, it is possible to define "zones" on the ASD corresponding to the particular operation which is being carried out in the ion exchange material corresponding to such fixed ports. According to the present invention, therefore, there is provided, at the very least, an adsorption zone and a stripping zone. In the preferred embodiment, there is provided an adsorption zone, a pre-strip zone, a stripping zone and a strip rinse zone.

The adsorption zone is defined by the fixed feed ports through which the phosphoric acid containing the complexed and oxidized vanadium is fed. In such adsorption zone, the sorbent, which travels in the direction indicated by the arrow 12 in FIG. 1, contains its minimum vanadium concentration and thus, the sorbent selectively extracts vanadium from the phosphoric acid feed. By contrast, the feed acid becomes more and more depleted in vanadium content as it traverses the adsorption zone due to the continuous adsorption of vanadium onto the sorbent. The fluid exits the adsorption zone at the point where the sorbent enters the same zone. This effluent (stream 13) is split into two flows. Stream 4 becomes the treated acid stream which is low in vanadium and is directed to the downstream processing operations of a phosphoric acid plant. Stream 5 is fed to the strip rinse zone as described below.

As the sorbent exits the adsorption zone it contains its maximum concentration of vanadium. Immediately after the sorbent leaves the adsorption zone it is drained of excess entrained feed acid, the drainage being returned to combine with stream 3 and re-enter the adsorption zone. The drained sorbent then enters the pre-strip zone. Drained sorbent is still "wet" and carries between 25% and 30% by volume of entrained fluid. The entrained fluid in the pre-strip zone is similar in composition to the feed acid, the last liquid in contact with the sorbent.

The drain step described above for sorbent exiting the adsorption zone is optionally repeated as the sorbent leaves any zone; namely, the pre-strip rinse, the stripping zone and the strip rinse. The drain step incorporated after the adsorption zone is important in order to control to a minimum the net flow of oxidized acid into the stripping zone, a subject discussed below in greater detail.

Sorbent traversing the pre-strip zone is contacted by a counter flow of reduced acid product (stream 8). Stream 8 volume flowrate is typically 0.1 to 1.0 times the sorbent volume flowrate. The fluid effluent from the pre-strip wash zone (stream 9) is routed to the reduction reactor or can be recycled to the adsorption feed zone. The purpose of the pre-strip zone is to ensure that all entrained oxidized acid is flushed from the sorbent phase prior to entering the stripping zone. Thus, the effluent stream 9 contains a mix of entrained oxidized acid and excess wash flow of reduced product acid. Efficiency considerations dictate the stream 8 flowrate be minimized so that excessive recycle of product acid does not occur unnecessarily. The operation of this zone can be considered a "sweetening-on" of the sorbent, with strip solution, prior to its entry into the stripping zone.

The sweetened sorbent passes from the pre-strip zone into the stripping zone in which the major part of the desorption occurs. Desorption does commence in the pre-strip zone since reduced acid in stream 8 introduced to the pre-strip zone will cause desorption of vanadium to begin. In a properly operated process, however, the fluid containing desorbed vanadium will report to stream 14 and not stream 9 through being entrained by the sorbent as it crosses the zone boundary between the pre-strip and the stripping zone.

The production of reduced acid occurs mainly in the reduction reactor into which the strip rinse zone effluent (stream 6), and the pre-strip zone effluent (stream 9) are fed. A suitable reducing agent (stream 10 is also introduced to the reactor. The reduced acid, (stream 7), has a redox potential of less than 800 millivolts (Ag-/AgCl, 4.0M KCl electrode). Reducing agent addition can also be effected incrementally during the passage of the reduced acid through the stripping zone by means of interstage injection, further described below.

In the stripping zone, sorbent and reduced acid, (stream 7), contact each other in counter current fashion as they travel through the zone. Vanadium in its +4, reduced form, has little affinity for the sorbent. Consequently, the oxidized, +5, vanadium species either desorbs from the solid phase and is immediately reduced to the +4 form, or it changes valence in the solid phase and then desorbs. Either mechanism permits the desorption process to continue to completion. Additionally, the desorption is highly selective for vanadium over other metals.

The concentration of vanadium in the reduced acid increases as it crosses the Stripping zone. The reactions shown below illustrate a typical sequence of desorption and conversion into the reduced species in solution:

Desorption of Vanadium Species $$RH^+ - VO_2.F.H_2PO_4^- \longrightarrow RH^+ - H_2PO_4^- + VO_2^+ + F^-$$
Resin (Pre Strip)            Resin (Post Strip)     Desorbed Ions Oxidation of Reductant $$SO_2(aq) + 2H_2O \rightarrow SO_4^{2-} + 4H^+ + 2e^-$$

Reduction of Vanadium $$2VO_2^+ + 4H^+ + 2e^- \rightarrow 2VO^{2+} + 2H_2O$$

Overall Redox Reaction $$2VO_2^+ + SO_2(aq) \rightarrow 2VO^{2+} + SO_4^{2-}$$

The illustration of $SO_2$ as the reductant in no way limits the use of alternative reducing agents such as hydrazine, thiosulfate, and other known reductants. The use of gaseous $SO_2$ is preferred for economic and process reasons. $SO_2$ oxidizes to sulphate, a species already present in the acid at gypsum saturation levels. The flow of fluid through the sorbent in the stripping zone is preferably upflow due to the formation of $CaSO_4$ precipitate.

Fluid redox potential control permits the quantitative desorption of vanadium from sorbent in the stripping zone, since $V^{4+}$ has little or no affinity for the sorbent. No significant anion transfer of sulphate, fluoride and $P_2O_5$ occurs, owing to the use of the same acid composition in both the adsorption and in the stripping zone. Also, no transfer was observed of other metals which are potentially subject to the redox reactions of the invention. Extraction of calcium, magnesium, aluminum, potassium, sodium and iron has also not occurred to any measurable extent into the reduced acid stripping solution. The redox potential of stream 7 is less than 800 millivolts and preferably in the range 250–350 mv (Ag-/AgCl 4.0M KCl electrode).

As the reduced acid vanadium concentration increases, its reducing power decreases. This is a direct result of the change in state of the desorbed vanadium species In order to maintain the redox potential below the critical level of reducing vanadium, the reducing power of the solution can be reinforced through interstage addition of reductant. In a counter-current contactor, like the ASD device, this is accomplished through on-stream measurement of the redox potential and use of this measurement to control addition of further reductant.

At the redox potentials employed $V^{3+}$ can exist. Its presence does not prevent further stripping and in fact $V^{3+}$ more than likely acts to reduce $V^{5+}$ generating a net $V^{4+}$ product.

Stream 14 is the effluent flow of reduced acid loaded with vanadium in its reduced state. This flow is split into the pre-strip zone feed (stream 8) and the vanadium product (stream 10). The vanadium concentration in the product steam ranges between 2,500 and 50,000 ppm (as $V_2O_5$) and is a function of both the sorbent loading/unit volume and the net ingress of entrained oxidized acid and excess rinse flow (stream 5).

Stripped sorbent, now in the $H_2PO_4^-$, $HSO_4^-$ and $SiF_6^{2-}$ forms, passes into the strip rinse zone where a "sweetening-off" process occurs. Entrained reduced acid from stream 7 accompanies the sorbent as it leaves the stripping zone. In order not to lose this fluid a steam of treated acid (stream 5) is introduced into the strip rinse zone to contact the sorbent in counter-current fashion and rinse out the entrained reduced acid. Usually, a small amount of excess flow, above the entrained volume, is employed to overcome axial mixing effects that prevent ideal plug flow from occurring. The ideal rinse would see a sharp front between the rinse fluid and that being rinsed, entrained reduced acid. Minimizing this excess rinse feed permits the maximization of the vanadium concentration in the product (stream 10).

Completion of the continuous cyclic operation occurs as the sorbent exits the strip rinse zone and reenters the adsorption zone in which it once again is in a suitable state to adsorb the oxidized vanadium species from the oxidized feed acid (stream 3).

Completion of the overall process for isolation of the vanadium is accomplished through oxidation of the vanadium product steam, (stream 10), with any suitable oxidant used on the feed material. Oxidation of reduced acid of relatively high vanadium concentration causes the precipitation of a phosphovanadic acid (PVA) solid species. The precipitated vanadium (stream 16) is recovered in a solid liquid separation operation, while the filtrate (stream 15) is recycled to the adsorption zone or the strip rinse zone liquid influent points. The ability to recycle the phosphoric acid filtrate is a significant advantage since it allows the process to be run without generating waste streams requiring special disposal provisions.

As an alternative completion of the overall process, the vanadium product stream can be evaporated to a higher $P_2O_5$ concentration and then oxidized to precipitate PVA. However, unlike prior processes, there is achieved according to the present invention a much higher vanadium yield at a lower evaporation load. The precipitated vanadium is recovered in a solid liquid separation as noted above and commercial $V_2O_5$ produced in accordance with known techniques.

Vanadium is recovered from the PVA precipitate by techniques well known in the art, such as described by Frick or Nelson.

The separation of vanadium from a wet process phosphoric acid has thus far been described as adsorption to load the anionic pentavalent vanadium complex onto a solid anion exchanger followed by selective desorption of vanadium from the solid exchanger phase by reduction thereof to its tetravalent form. In an alternative embodiment, the anionic pentavalent vanadium complex may be subjected to a solvent extraction process.

A different anionic carrier is a water immiscible liquid extractant. Examples of liquid extractants for removal of vanadium from wet process phosphoric acid include tri-N-octylphosphine oxide (TOPO), amines such as alamine 336, and quaternary ammonium extractants such as aliquat 336.

The chemical reactions involved in the adsorption of the anionic vanadium complex and the stripping of the same in the solvent extraction process are identical to those involved in the ion exchange process. The liquid extractant is dissolved in an organic based water immiscible diluent such as kerosine, benzene, toluene, and various other suitable hydrocarbons.

Initially, in a manner identical to the ion exchange process, the phosphoric acid in the extraction process is first oxidized to form the same proposed anionic complex.

The four ion exchange steps previously described have analogous steps in the alternative solvent extraction scheme, i.e., adsorption of the vanadium complex into the organic layer, an optional pre-strip step, stripping of the vanadium from the organic layer using reduced phosphoric acid and finally rinsing the organic extractant and diluent with aqueous adsorption zone discharge. The rinse step will remove any entrained strip solution from the organic and "pre-oxidize" the organic layer prior to its returning to the adsorption zone.

It should be recognized that "zones" in solvent extraction refer to equipment well known to those skilled in the art such as mixer settlers. A mixer settler is a piece of equipment whereby an organic phase and an aqueous phase are mixed, usually continuously in a countercurrent operation, and then the mixed phases separated back into aqueous and organic layers in the separator and taken away for further processing.

The following examples are given by way of illustration and in no way should be construed as limiting the subject matter disclosed and claimed.

EXAMPLE 1

First, 63 mls of the weak base resin Duolite A-368 was prepared to the phosphate form and put in a 1.5 cm diameter column to a depth of 35 cm.

A batch of four liters of wet process phosphoric acid was pretreated with sixteen mls 30% hydrogen peroxide of oxidize the iron present as $Fe^{2+}$ in 30% wet process phosphoric acid. Next, 2.4 grams of potassium dichromate was added to oxidize the vanadium fully. The oxidized acid had an oxidation reduction potential between 900 to 1150 versus the Ag/AgCl 4.0 m KCl electrode with 1099 mv being measured in this case. Similarly, a separate batch of 500 mls of wet process phosphoric acid was pretreated by sparging in an excess of sulfur dioxide.

The following two steps were performed to effect the vanadium sorption and desorption.

STEP 1

Figure 3:
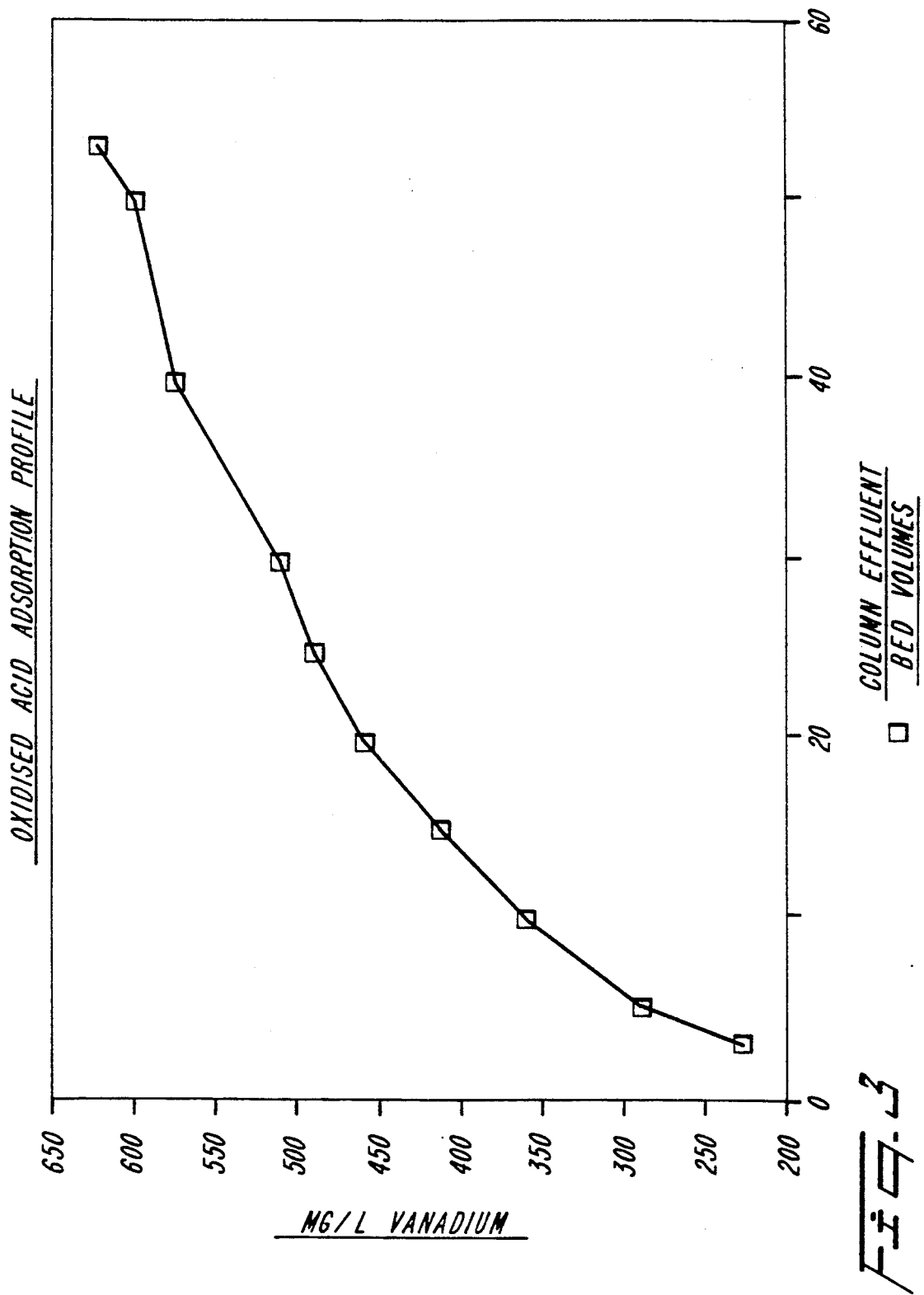
FIG. 3 is a graph depicting the adsorption profile of vanadium concentration as a function of bed volumes of column effluent.

A fresh volume of oxidized acid was fed downflow to the column at a rate of 12 bvs/hour for 265 minutes. The effluent was collected in fractions of 1 bv. The profile of vanadium concentration during this step is illustrated in FIG. 3. The column was then drained.

STEP 2

Figure 4:
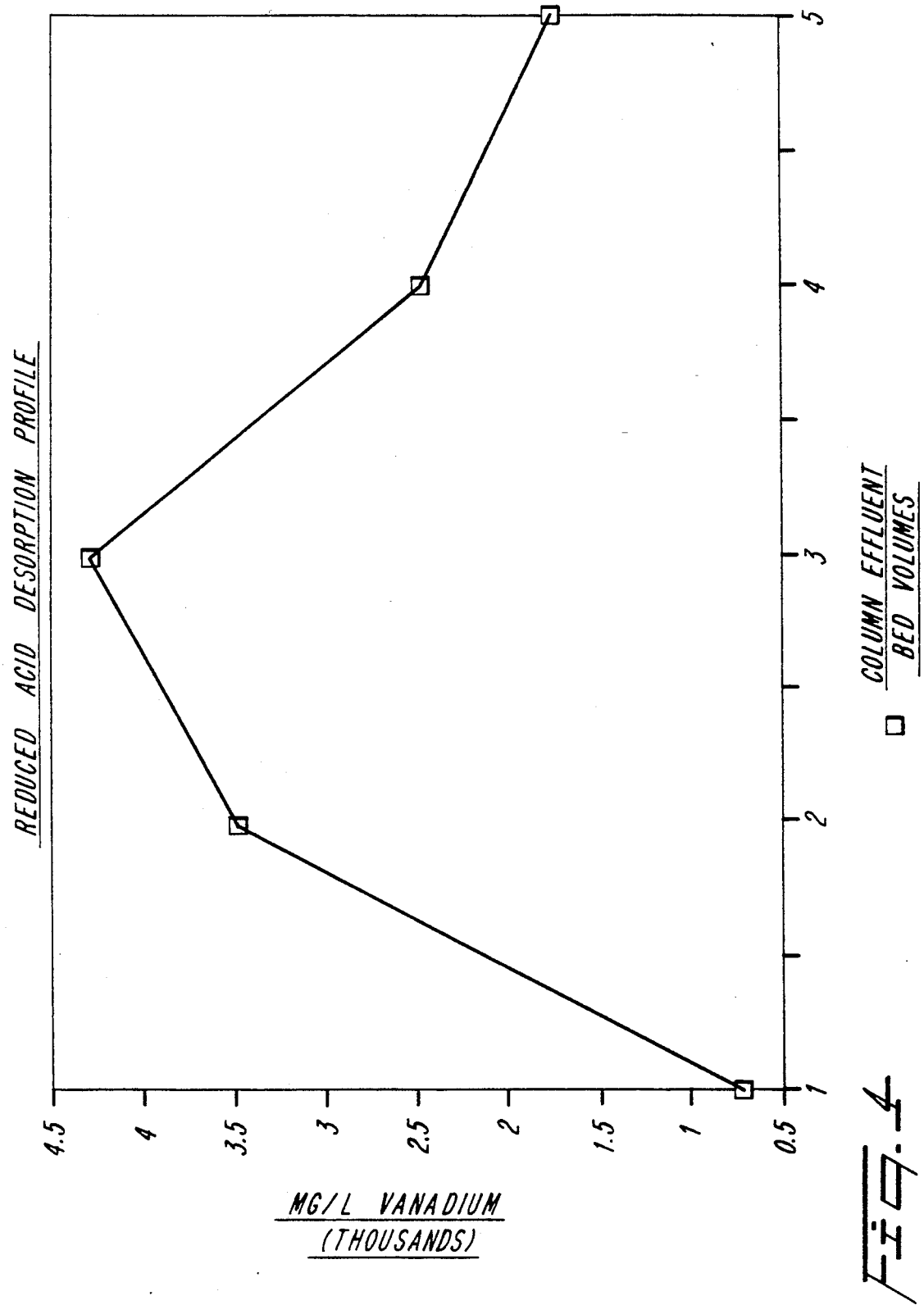
FIG. 4 is a graph depicting the elution profile of vanadium as a function of bed volumes of column effluent.

A volume of reduced acid was then introduced to the column at a rate of 8.5 bv/hour for 35 minutes. The reduced acid flows down through the bed and the column effluent fractions were collected in 1 bv aliquots. FIG. 4 shows a typical elution profile for this step.

EXAMPLE 2

103 mls of Duolite A-368 was contacted with five liters of oxidized 30% wet process phosphoric acid that had been oxidized with sodium chlorate to a oxidation reduction potential of 900 to 1150 mv versus the Ag/AgCl 4.0 m KCl electrode.

The resin was separated from the liquid and split into six equal portions by volume. Then, 100 mls of 30% wet process phosphoric acid was reduced with excess sulfur dioxide to an electrode potential of 250 to 350 mv versus the Ag/AgCl 4.0 m KCl electrode.

This 100 mls of reduced wet phosphoric acid was then contacted successively in series with each of the six resin portions. A solid liquid separation was performed after each contact.

The concentration of vanadium in the reduced wet process phosphoric acid before commencing the test and after each contact is shown in the following table.

|  | Vanadium Concentration Mg/L |
|---|---|
| 100 mls Reduced Wet Process Phosphoric Acid | 675 |
| Contact 1 | 1232 |
| Contact 2 | 185 |
| Contact 3 | 2428 |
| Contact 4 | 3155 |
| Contact 5 | 3606 |
| Contact 6 | 4146 |

This test demonstrates the ability of the technique to concentrate vanadium in reduced phosphoric acid from oxidized phosphoric acid.

The reduced acid from contact six was subsequently treated with sodium chlorate. A yellow material precipitated which had a vanadium to phosphorus molar ratio of approximately one and was substantially free of other contaminants indicating that the substance was phosphovanadic acid. Analysis of the solution revealed that approximately 90% of the vanadium had precipitated. Phosphovanadic acid can be treated by known means to recover vanadium as vanadium pentoxide.

From the above detailed description of the invention, it is apparent that a number of significant advantages are obtained using the claimed process as compared to both the precipitation and solvent extraction processes characterizing the prior art. Thus, whereas prior art processes typically added foreign chemical species which were potentially deleterious to both the quality and the marketability of the final product, the present invention requires only minimal amounts of innocuous reagents. For example, the $SO_2$ added is not toxic. Additionally, it reacts in the process to form sulfate which is already present in the feed fluids. In similar fashion, $NaClO_3$ ultimately converts to a precipitate of $Na_2SiF_6$ and $Cl_2$ gas.

Because the present process does not rely on precipitation of the vanadium from the phosphoric acid to achieve the separation therefrom, the present invention provides the additional advantage of not having a portion of the vanadium corresponding to its solubility being lost. Additionally, even in the later step wherein tetravalent vanadium is oxidized to a PVA precipitate, There is no loss of vanadium (corresponding to its solubility) since the stream containing solubilized vanadium (corresponding to stream 15 in FIG. 1) is recycled.

In terms of the materials fed into and discharged from the system, it is noted that the present invention uses a single feed for adsorption and desorption, does not require the wash or rinse fluids typically used for ion exchange or solvent extraction, does not give rise to waste streams, and requires no water of dilution in the product phosphoric acid streams.

The invention also enables highly selective removal of vanadium from the exchange resin by virtue of using a redox reaction as the basis for the separation. Thus, not only do typical anions or cations not transfer but, in addition, other potential redox species such as iron, chromium, and molybdenum do not transfer.

Although only preferred embodiments of the invention are specifically illustrated and described above, it will be appreciated that many modifications and variations of the present invention are possible in light of the above teachings and within the purview of the appended claims without departing from the spirit and intended scope of the invention.

What is claimed is:

1. A process for removal of vanadium from wet process phosphoric acid comprising the steps of:
   (i) absorbing an anionic pentavalent complex of vanadium, derived from said wet process phosphoric acid, onto an anion exchange resin; and
   (ii) reducing said vanadium complex to either trivalent or tetravalent vanadium or both so as to selectively strip vanadium from said anion exchange resin.

2. The process of claim 1 further comprising the step of oxidizing either said trivalent or tetravalent or both stripped from said anion exchange resin to precipitate phosphovanadic acid.

3. The process of claim 2 further comprising the step of separating said precipitated phosphovanadic acid from a filtrate and recycling said filtrate.

4. The process of claim 1 wherein said step of reducing said vanadium complex to either trivalent or tetravalent or both is carried out with a wet process phosphoric acid stripping solution including a reducing agent.

5. The process of claim 4 wherein said stripping solution has a $P_2O_5$ concentration of about 25–30%.

6. The process of claim 5 further comprising the step of (i) evaporating water from said strip solution to obtain a $P_2O_5$ concentration greater than 30% and (ii) oxidizing either said trivalent or tetravalent vanadium or both stripped from said anion exchange resin to precipitate phosphovanadic acid.

7. The process of claim 1 wherein said anionic pentavalent Vanadium complex is reduced with a reducing agent having a redox potential of less than 800 millivolts (Ag/AgCl 4.0M KCl electrode).

8. The process of claim 7 wherein said anionic pentavalent vanadium complex is reduced with a reducing agent having a redox potential of between about 250 and 350 millivolts (Ag/AgCl 4.0M KCl electrode).

9. The process of claim 8 wherein said reducing agent is sulfur dioxide or hydrazine.

10. The process of claim 9 wherein said reducing agent is gaseous sulfur dioxide.

11. The process of claim 1 wherein said anionic pentavalent complex of vanadium, derived from said wet process phosphoric acid and adsorbed to an anion exchange resin is obtained by:
   (i) oxidizing vanadium contained in said phosphoric acid stream to pentavalent vanadium;
   (ii) complexing said pentavalent vanadium with an anionic species to form said anionic pentavalent vanadium complex capable of being adsorbed onto an anion exchange resin site;
   (iii) adsorbing said anionic pentavalent vanadium complex onto said anion exchange resin.

12. The process of claim 11 wherein said vanadium in said wet process phosphoric acid is oxidized to its pentavalent state with an oxidizing agent which, when combined with said stream including phosphoric acid and tetravalent vanadium, forms a solution having a redox potential ranging between about 900 and 1150 millivolts (Ag/AgCl, 4.0M KCl electrode).

13. The process of claim 12 wherein said oxidizing agent is $H_2O_2$, $NaClO_3$, liquid oxygen, Caro's acid ($H_2SO_5$) or $MnO_2$.

14. The process of claim 1 wherein said anionic pentavalent complex of vanadium adsorbed onto an anion exchange resin is in an aqueous medium.

15. A process for removal of vanadium from phosphoric acid comprising the steps of:
   (i) oxidizing vanadium contained in a phosphoric acid to pentavalent vanadium
   (ii) complexing said pentavalent vanadium with an anionic species to form an anionic pentavalent vanadium complex capable of being adsorbed onto an anion exchange resin site;
   (iii) feeding said anionic vanadium complex through one or more fixed feed ports, defining an adsorption stage, which are in periodic fluid communication with a plurality of chambers rotating about a circular path and containing said anion exchange resin and thereby adsorbing said anionic pentavalent vanadium complex onto said anion exchange resin; and
   (iv) feeding a stream including a reducing agent through one or more fixed feed ports, defining a recovery stage, which are in periodic fluid communication with said plurality of chambers, and contacting said reducing agent with said anionic pentavalent vanadium complex adsorbed onto said anion exchange resin to convert said pentavalent vanadium to trivalent and/or tetravalent vanadium to selectively desorb vanadium from said resin.

16. A process for removal of vanadium from wet process phosphoric acid comprising the steps of:
   (i) adsorbing an anionic pentavalent complex of vanadium, derived from said wet process phosphoric acid, into an organic layer; and
   (ii) reducing said vanadium complex to either trivalent or tetravalent vanadium or both so as to selectively strip vanadium from said organic layer using a wet process phosphoric acid stripping solution as the reducing agent.

17. The process of claim 16 further comprising the step of oxidizing either trivalent or tetravalent vanadium or both stripped from said organic layer to precipitate phosphovanadic acid.

18. The process of claim 17 further comprising the step of separating said precipitated phosphovanadic acid from a filtrate and recycling said filtrate.

19. The process of claim 16 wherein said stripping solution has a $P_2O_5$ concentration of about 25–30%.

20. The process of claim 19 further comprising the steps of (i) evaporating water from said strip solution to obtain a $P_2O_5$ concentration greater than 30% and (ii) oxidizing either said trivalent or tetravalent vanadium or both stripped from said organic layer to precipitate phosphovanadic acid.

21. The process of claim 16 wherein said anionic pentavalent vanadium complex is reduced with a reducing agent having a redox potential of less than 800 millivolts (Ag/AgCl 4.0M KCl electrode).

22. The process of claim 21 wherein said anionic pentavalent vanadium complex is reduced with a reducing agent having a redox potential of between about 250 and 350 millivolts (Ag/AgCl 4.0M KCl electrode).

23. The process of claim 22 wherein said reducing agent is sulfur dioxide or hydrazine.

24. The process of claim 23 wherein said reducing agent is gaseous sulfur dioxide.

25. The process of claim 16 wherein said anionic pentavalent complex of vanadium, derived from said wet process phosphoric acid and adsorbed to an anion exchange resin is obtained by:
   (i) oxidizing vanadium contained in said phosphoric acid stream to pentavalent vanadium;
   (ii) complexing said pentavalent vanadium with an anionic species to form said anionic pentavalent vanadium complex capable of being adsorbed into an organic layer;
   (iii) adsorbing said anionic pentavalent vanadium complex into said organic layer.

26. The process of claim 25 wherein said vanadium in said wet process phosphoric acid is oxidized to its pentavalent state with an oxidizing agent which, when combined with said stream including phosphoric acid and tetravalent vanadium, forms a solution having a redox potential ranging between about 900 and 1150 millivolts (Ag/AgCl, 4.0M KCl electrode).

27. The process of claim 26 wherein said oxidizing agent is $H_2O_2$, $NaClO_3$, liquid oxygen, Caro's acid ($H_2SO_5$) or $MnO_2$.

* * * * *